United States Patent

[11] 3,576,999

| | | |
|---|---|---|
| [72] | Inventors | Richard Blythe;<br>Gerald C. Scott; Edgar A. Work, Jr.;<br>Donald S. Lowe; Philip G. Hasell, Jr., Ann Arbor, Mich. |
| [21] | Appl. No. | 609,520 |
| [22] | Filed | Jan. 16, 1965 |
| [45] | Patented | May 4, 1971 |
| [73] | Assignee | The Bendix Corporation |

[54] METHOD AND APPARATUS FOR DETERMINING THE ORIENTATION OF AN OBJECT RELATIVE TO AN ELLIPTIC OBJECT
14 Claims, 10 Drawing Figs.

[52] U.S. Cl. .................................... 250/203,
250/208, 250/209, 250/83.3
[51] Int. Cl. ..................................... G01j 1/20
[50] Field of Search ............................ 250/202,
203, 208, 209, 210, 83.3

[56] References Cited
UNITED STATES PATENTS

| 2,999,161 | 9/1961 | Lovoff ......................... | 250/202X |
| 3,201,591 | 8/1965 | Froelich ...................... | 250/83.3 |
| 3,234,843 | 2/1966 | Killpatrick .................... | 250/202X |
| 3,240,941 | 3/1966 | Zuckerbraun ................. | 250/202X |

*Primary Examiner*—James W. Lawrence
*Assistant Examiner*—C. R. Campbell
*Attorney*—Plante, Arens, Hartz, Smith & Thompson ABSTRACT: Method and apparatus for maintaining the orientation of an object, such as a satellite or spacecraft, with respect to a primary object, such as the earth, by sensing points of interception of the primary object's horizon with two scan lines and correlating the sensed information.

PATENTED MAY 4 1971

INVENTOR.
RICHARD BLYTHE
GERALD C. SCOTT
BY EDGAR A. WORK, JR.
DONALD S. LOWE
PHILIP G. HASELL, JR

ATTORNEY

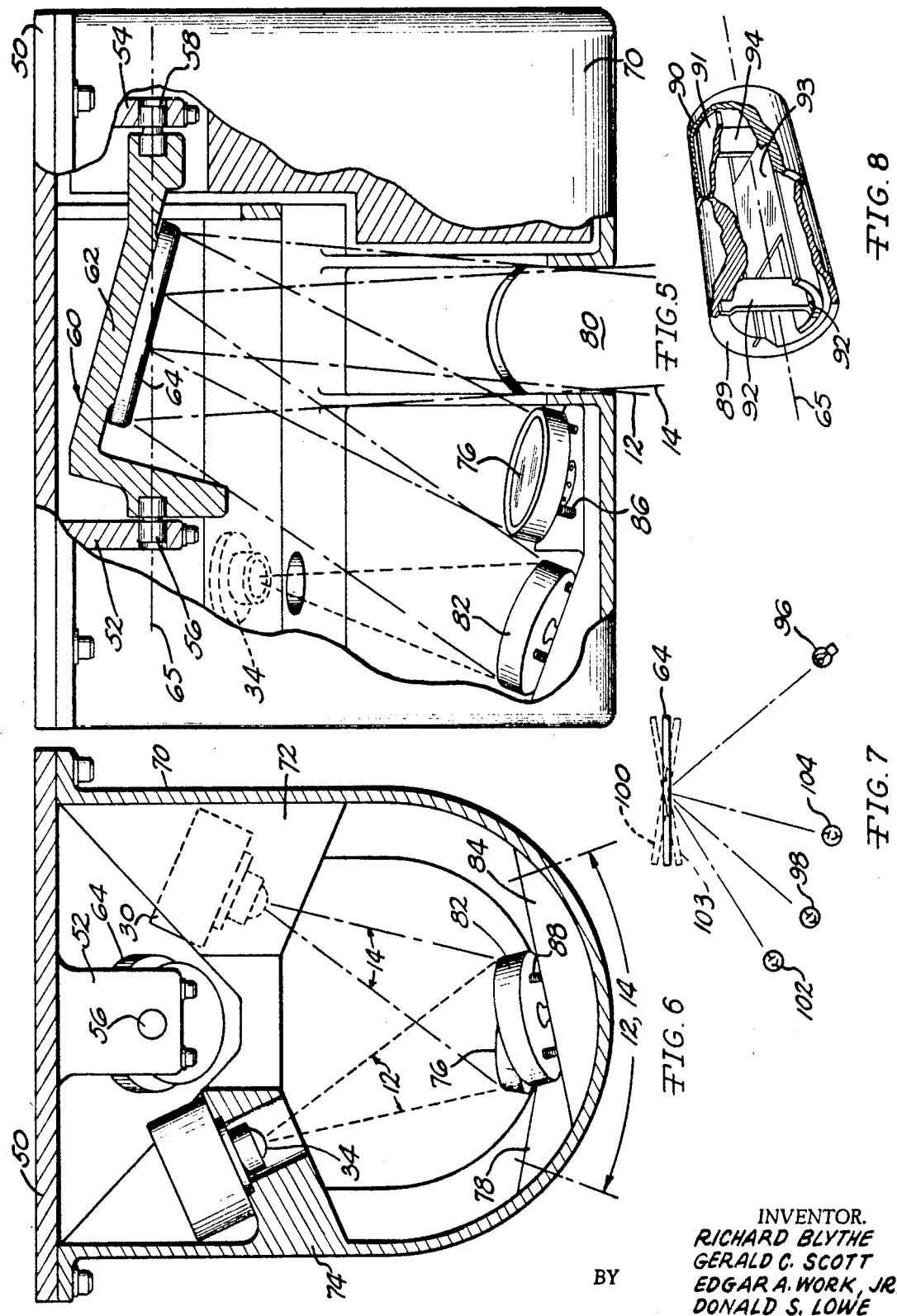

METHOD AND APPARATUS FOR DETERMINING THE ORIENTATION OF AN OBJECT RELATIVE TO AN ELLIPTIC OBJECT

This invention relates generally to the art of stabilizing an object relative to the horizon and more particularly to the method and the apparatus for scanning and sensing the horizon to determine the location of the horizon relative to the object.

Certain objects moving outside the earth's atmosphere, such as satellites, missiles, space probes, spacecrafts, or the like are often required to maintain a fixed attitude relative to the earth. One technique that has been employed uses infrared detection to sense the horizon of the earth based on a noticeable radiation gradient at the horizon. The systems employing this technique that have been proposed generally suffer from one or more disadvantages particularly with systems for use with synchronous orbit satellites and deep space probes. For such applications, it is often essential that the stabilizing apparatus be capable of reliable operation for periods of a year or more. It is also desirable that the weight, power, and volume requirements of the stabilizing apparatus be minimized while reliability and accuracy are optimized.

Thus, the objects of the present invention are to sense the horizon of a radiating body such as the earth by simple and improved methods and apparatuses.

Other objects of the present invention are to provide a horizon sensor that is simple in construction and operation; that is reliable; that has a minimum number of mechanical parts and is not subject to mechanical failures when used over extended periods; that can achieve a required scanning pattern with essentially only one moving part; that is reasonably accurate; that is compact and lightweight; that has relatively low-power consumption; and that operates over a wide range of altitudes without adjustment and is operable over even wider ranges with minor adjustments.

A still further object of the present invention is to sense the horizon by a method that achieves the aforementioned advantages.

Other objects, features and advantages of the present invention will become apparent in connection with the following description, the appended claims and the accompanying drawings in which:

FIG. 5 is a side view of the optical and mechanical portion of the scanning apparatus of the present invention with portions broken away and in section;

FIG. 6 is an end view of the scanning apparatus illustrated in FIG. 5 with a portion of the housing removed;

FIG. 7 is a view diagrammatically illustrating an arrangement for obtaining reference signals representing the end limits and centers of the scanning lines shown in FIGS. 1, 3a, 3b, 4a and 4b; and FIG. 8 is a perspective view partly broken away and in section of a flexural pivot used to support a scanning mirror.

In general this invention contemplates generating a pair of reciprocating line scans which oscillate across and beyond the earth's image. When each scan crosses the horizon from space to earth, the moment of transition is detected by infrared detection means. Selected transitions are then correlated to provide error signals representing any deviation from a predetermined attitude for the spacecraft or the like relative to the earth.

Figure 1:
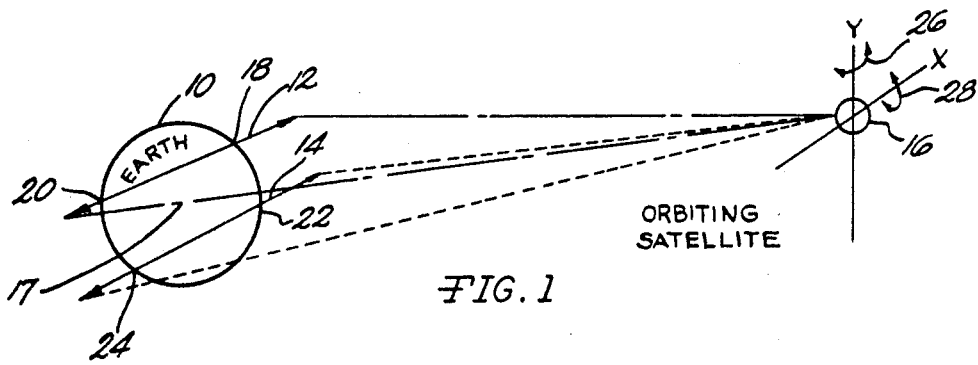
FIG. 1 is a view diagrammatically illustrating a dual reciprocating scan of the present invention applied to stabilizing a satellite orbiting the earth.

FIG. 1 shows the earth 10 together with dual scanning lines 12, 14 from which infrared radiation is received by a satellite 16 orbiting the earth. The scanning lines 12, 14 are rectilinear and are spaced apart in parallel relation such that in steady state operation each scanning line extends across and beyond the earth's horizon. The scanning line 12 is above the earth's center 17 as viewed in FIG. 1 and encounters two horizon crossings 18, 20 in each scanning direction whereas the scanning line 14 is below the center 17 and also encounters two horizon crossings 22, 24 in each scanning direction. By infrared detection techniques the time and location of the crossings 18—24 in their respective lines 12, 14 are noted and then selected crossings are correlated by the circuit illustrated in FIG. 2 to obtain two indications which represent any deviation by the satellite 16 about X- and Y-axes from a predetermined orientation relative to the earth 10. For purposes of illustration only, rotational deviations about the Y-axis in directions indicated by the arrow 26 may be termed a roll error. Rotational deviations about the X-axis in directions indicated by the arrow 28 may be treated as pitch error.

Figure 2:
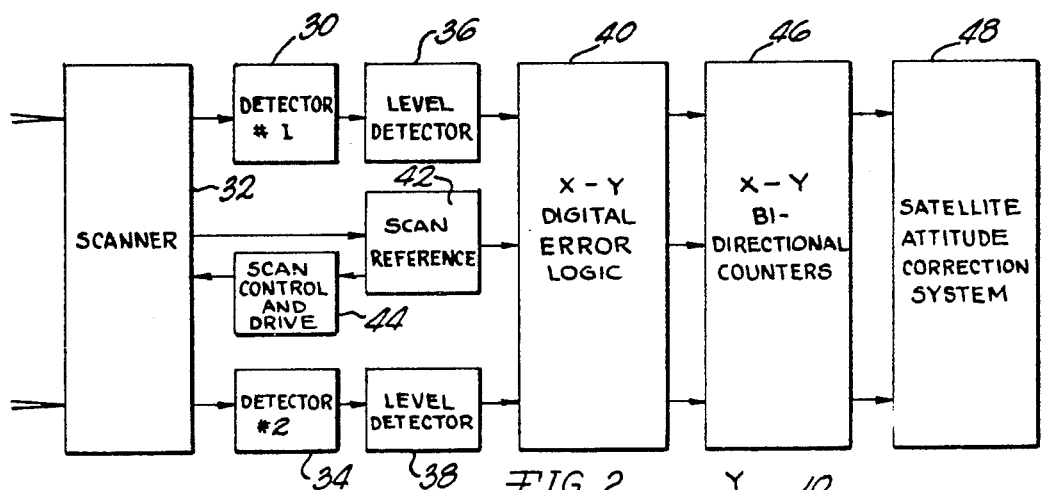
FIG. 2 is a block diagram functionally illustrating an electrical circuit for detecting and correlating horizon crossing indications produced by the scanning illustrated in FIG. 1 to obtain error signals representing any deviation by the satellite from a predetermined attitude relative to the earth.

Referring to the electrical circuit illustrated by block diagram in FIG. 2, a first infrared detector 30 is imaged and the detector image is scanned along the scanning line 12 by a mechanical scanner 32. Similarly the second detector 34 is imaged and the detector image is scanned along the scanning line 14 by the mechanical scanner 32. Stated somewhat differently the scanner 32 focuses relatively narrow radiation beams from the scan lines 12, 14 and the scanner moves the beams progressively in first one direction as from right to left as viewed in FIG. 1 across and beyond earth 10 and then in the opposite direction to the point of beginning to complete one scanning cycle. It will be apparent that scanning can be considered in one sense as focusing a narrow beam of radiation from the scan lines 12, 14 onto the detectors 30, 34 and in a second sense by considering images of the detectors 30, 34 as being projected onto the scan lines 12, 14. The two senses are equivalent in so far as scanning is concerned.

Detector 30 develops an electrical signal which varies in accordance with radiation level variations along line 12 as the image of detector 30 is scanned along the scan line and the signal is applied to a first level detector 36. Similarly detector 34 develops an electrical signal which varies in accordance with the radiation level along line 14 as the image of detector 34 is scanned along the line and the electrical signal is applied to a second level detector 38. Each of the level detectors 36, 38 has a threshold selected so that the detectors do not respond to radiation along the lines 12 and 14 until a large radiation gradient is encountered at one of the horizon crossings 18—24. Additionally, in the preferred embodiment the level detectors 36, 38 develop an output only during a transition at the crossings 18—24 occurring in a direction from space to earth. Thus referring to FIG. 1 detector 36 develops a first output when the image of detector 30 moves across the horizon at the crossing 18 in a direction from right to left and a second output when the detector image moves across the horizon at the crossing 20 in a direction from left to right. The detector 38 develops a first output when the image of detector 34 crosses the horizon at the crossing 22 in a direction from right to left as viewed in FIG. 1 and a second output when the detector image moves across the horizon at the crossing 24 in a direction from left to right.

The four outputs developed by detectors 36, 38 during each scanning cycle are applied to an X–Y digital error logic circuit 40. The logic circuit 40 also receives scanning reference signals from a scan reference circuit 42 which in turn is controlled from the scanner 32. Reference signals are provided by the reference circuit 42 when the scanning beams are at the right and the left limits of lines 12, 14 to instruct the logic circuit 40 as to which direction is then being scanned along lines 12, 14 and to also provide other logic instructions to be described. Reference signals are also developed by the reference circuit 42 and applied to the logic circuit 40 when scanning passes through the center of each scan line 12, 14. Reference signals developed by the scan reference 42 are also fed to a scan control and drive circuit 44 which controls the mechanical scanner 32 to maintain scanning within prescribed angular limits.

The logic circuit 40 selects particular ones of the horizon crossings 18—24 identified by detectors 36, 38 and reference circuit 42, and applies them to X-Y bidirectional counters 46. Based on at least two of the horizon crossings 18, 20 (line 12) or 22, 24 (line 14), counters 46 develop a first digital error signal representing deviation by satellite 16 in a rotational direction about the Y-axis. In response to at least two of the horizon crossings 18, 20 (line 12) and 22, 24 (line 14), the counters 46 also develop a second digital error signal representing any deviation by the satellite 16 in a rotational direction about the X-axis. The digital signals developed by counters 46 are applied to a satellite attitude correction system 48 where they are converted to analog form and used to reposition the satellite 16 and thus maintain satellite 16 in a predetermined fixed relation to the earth 10.

Referring to the optical and mechanical arrangement of scanner 32 (FIGS. 5 and 6) a generally flat base 50 has a pair of integral brackets 52, 54 which are spaced apart horizontally and depend downwardly from base 50 as viewed in FIGS. 5 and 6. Journaled on the lower ends of brackets 52, 54 by bearings 56, 58 is a frame member 60 having a canted central portion 62. A flat oscillating mirror 64 is fastened on the lower side of portion 62 to face generally downwardly and forwardly toward the right as viewed in FIG. 5. Bearings 56, 58 and frame 60 support mirror 64 for limited angular oscillation about an axis 65 when the frame is driven by suitable means (not shown) in the scan control and drive 44 (FIG. 1).

Also fastened on the base plate 50 is a hollow housing member 70 which is formed with lateral support portions 72, 74 disposed at opposite sides of the mirror 64. The first detector 30 is mounted on the support portion 72 and is directed generally downwardly and to the left as viewed in FIG. 6 toward an off axis paraboloidal mirror 76. Mirror 76 is mounted on an inclined support block 78 in the lower portion of housing 70 and is directed toward mirror 64 to receive radiation entering housing 70 through an elongated entrance aperture 80 and reflected from mirror 64. Detector 34 is mounted on the other lateral support portion 74 and is directed generally downwardly and to the right as viewed in FIG. 5 toward a second off axis paraboloidal mirror 82. Mirror 82 is mounted on an inclined support block 84 in a lower portion of housing 70 and is directed toward mirror 64 to receive radiation entering housing 70 through aperture 80 after reflection by the mirror 64. The exact orientation of mirrors 76, 82 can be adjusted by means of set screws 86, 88 respectively, so that radiation from lines 12, 14 is reflected onto detectors 30, 34. Stated differently, detector 30, mirrors 76, 64 and the aperture 80 are disposed such that the image of detector 30 is focused and projected by the mirrors 76, 64 through aperture 80 and the image of detector 30 reciprocates along line 12 (FIG. 1) when mirror 64 oscillates. Similarly detector 34, mirrors 82, 64 and the aperture 80 are disposed so that the image of detector 34 is projected through aperture 80 and the image of detector 34 reciprocates along line 14 (FIG. 1) when mirror 64 oscillates.

In the preferred embodiment of the present invention bearings 56, 58 are flexural pivots. One such pivot described in detail in U.S. Pat. No. 3,252,696 and shown herein in FIG. 8, includes a pair of axially aligned sleeve sections 89, 90. Each of the sections 89, 90 has an integral inner sleeve portion 91, 92, respectively, telescoped concentrically into the other one of the outer sleeve sections. The sections 89, 90 are interconnected by three flat springs 92, 93, 94 with spring 93 disposed orthogonally to springs 92 94. Springs 92, 93, 94 flex to permit limited angular rotation between the sections 89, 90 about the axis 65 without sliding or rolling friction so that lubrication is not required. Additionally, flexural pivots can be constructed to oscillate at a natural frequency corresponding to a desired scanning rate, for example, 4 cycles per second and thus only intermittent driving of the scanning mirror 64 is required to maintain a minimum oscillation amplitude.

Although a particular arrangement to develop reference signals for the logic circuit 40 is not essential to the present invention, one technique that has been used with the present invention is illustrated in FIG. 7 and comprises a beam-type light source 96 which directs a light beam toward the scanning mirror 64 where it is reflected at different angular positions depending on the position of the mirror 64. When mirror 64 is located at the center of an oscillation as shown in full lines in FIG. 7 light from source 96 is reflected by mirror 64 to a photocell 98 to provide a reference signal at the center of each scanning line 12, 14 (FIG. 1). When the mirror 64 is at one limit of an oscillation, for example, a right limit of the scanning lines 12, 14 as illustrated in FIG. 1, the mirror will be disposed as illustrated in dash lines designated by numeral 100 and light from the source 96 will actuate a second photocell 102 to indicate the right limit of the scan lines 12, 14. Similarly when the mirror 64 is at the other limit of an oscillation, the left limit as illustrated in FIG. 1, mirror 64 will be in a position illustrated by broken lines and designated by numeral 103 so that light from source 96 actuates a photocell 104 to indicate the left scanning limit. The photocells 102, 104 also provide an indication when oscillation of mirror 64 is below a required minimum amplitude since neither photocell will receive light from source 96. In response to this indication the frame 60 can be given a slight kick by suitable means such as a pulsed solenoid or other electromechanical means.

The scanning sequence and method of horizon sensing together with the operation of the electrical circuit illustrated in FIG. 2 and the operation of the optical and mechanical arrangements illustrated in FIGS. 5, 6 and 7 are best understood in connection with the diagrams of FIGS. 3 and 4. Assuming an initial position of satellite 16 such that the scanning lines 12, 14 cross the horizon of the earth 10 at locations 18—24 as shown in FIG. 1, at the completion of a scanning cycle the scan reference 42 (photocell 102) instructs the logic circuit 40 that a scan cycle has been completed and the logic circuit resets counters 46 to zero to begin the next scanning cycle. For purposes of explanation the center of the scan lines 12, 14 is designated by a vertical dashed line 110 and a roll error is designated by a displacement $x$ measured along the X-axis. Each of the scan lines 12, 14 is considered as comprising a first scan $S_1$ which begins at the right end of the scan lines as viewed in FIGS. 1, 3 and 4 and terminates at the center 110 as scanning progresses from right to left. The second scan $S_2$ begins at the center 110 and terminates at the left end of the scan line as scanning continues from right to left. On the return scan from left to right, the scan from the left end to the center 110 is designated as scan $S_3$ and the final scan in a scanning cycle from center 110 to the right end of the scanning lines 12, 14 is designated as $S_4$. During the scan $S_1$ the images of detectors 30, 34 progress synchronously from right to left until the horizon crossings 18, 22 are encountered.

Figure 3A:
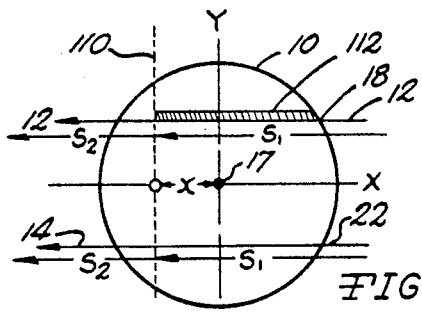
FIGS. 3a and 3b are diagrams illustrating operation of the circuit shown in FIG. 2 and further illustrating how an error indication for deviation in one direction is obtained from the scanning pattern of the present invention.
Figure 3B:
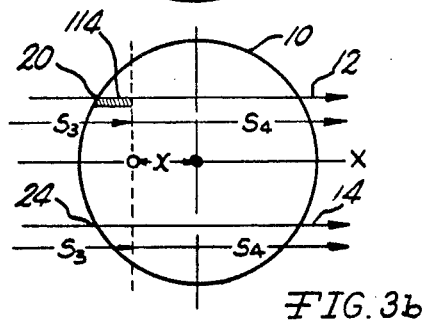

Considering first a roll deviation about the Y-axis, as illustrated in FIGS. 3a, 3b, the first one of the detectors 30, 34 that acquires the horizon is noted by the logic circuit 40 and enables counters 46 to begin accumulating counts from an internal clock source (not shown). After the first horizon crossing, either 18 or 20, whichever is first acquired by one of the detectors 30, 34, the counters will continue to accumulate counts for the remainder of the scan $S_1$. When the scanning progresses to the center 110, the counters are turned off by the scan reference 42 (photocell 98) which the count accumulated during $S_1$ stored in the counters during the entire scan $S_2$. By way of example assuming that the detector 30 first encountered the horizon at the crossing 18 on scan line 12, the count would be accumulated during the scanning interval designated by a cross hatch portion 112 during the scan $S_1$. The count accumulated during the scanning interval 112 is stored and at the end of the scan $S_2$, the counters are again rendered capable of counting by the logic circuit 40 in response to an output at photocell 104 in the scan reference circuit 42. When the detector 30 encounters the crossing 20 on the return scan $S_3$, the logic circuit 40 initiates counting in the opposite direction. During the scan $S_3$ counters 46 will count in the opposite direction from the counting direction during the scan $S_1$ until scanning progresses to the center 110 as illustrated by the cross hatched interval 114 (FIG. 3b). At the completion of scan $S_3$, counting is terminated at the center 110 by the logic circuit 40 in response to a signal from the scanning reference 42 (photocell 98). If the scanner is not centered as illustrated in FIGS. 3a, 3b, the counter will have an accumulated count at the end of scan $S_3$ whose magnitude and direction represent the displacement X on the X-axis based on a difference between the scanning intervals 112, 114. The displacement $x$ is in turn proportional to the error in angular displacement of satellite 16 about the Y-axis from the predetermined relation to earth 10. By way of further example if the scanner is properly centered the count in one direction accumulated by counters 46 during the scan $S_1$ will be cancelled out by the count in the opposite direction during scan $S_3$. During scan $S_4$, the scanner is again insensitive to radiation and the digital count accumulated in counters 46 is transferred to the satellite attitude correction system 48 for conversion to an analog voltage to reposition the stellite. During the scan $S_4$ the counters 46 are allowed to count back to zero while the count is transferred to the correction system 48 and at the end of scan $S_4$ counters 46 are reset by the scan reference 42 (photocell 104) to begin the scanning cycle.

Although in the preferred embodiment bidirectional counters are preferred to determine the difference $x$ between the intervals 112, 114, separate counters can be used for scans $S_1$, $S_3$ and their accumulated counts subtracted by conventional difference circuits to obtain a difference signal representing the displacement $x$. Since only one of the detectors, either detector 30 or detector 34 whichever is the first to acquire the horizon of the earth 10, is used to determine error about the Y-axis, any slight dissimilarity in the detectors will not affect the error determination. Any error due to a variation in the detector time constants is minimized since the same detector is used and the horizon crossing always occurs in a direction from space to the earth. Thus a time constant lag will tend to make the earth 10 appear smaller but over several scanning cycles the deviation about the Y axis will be reduced to zero by the correction system 48. Once a discontinuity is noted at the horizon crossings 18—24, the counters will continue to count until the center 110 of the scanning lines 12, 14 is reached and spurious radiation such as radiation from a cold cloud will not disable the counters. Precise calibration of the detectors 30, 34 is not essential since the only information that is used is the occurrence of radiation gradient at the horizon crossings 18—24 and so long as the gradient at the crossing is above the threshold of the level detectors 36, 38, the necessary instructions will be fed to the logic circuit 40. Sensitivity changes in the detectors 30, 34 due to temperature can be minimized by using large heat sinks and including the detectors in bridge circuits together with temperature-compensating thermistors. Detectors 30, 34 may be immersed thermistors. The level detectors 36, 38 and logic circuit 40 are also constructed in the preferred embodiment to respond to exceedingly high level radiation from the sun to disable and reset counters 46 through the logic circuit 40 whenever the sun is acquired by either of the detectors 30, 34.

Figure 4A:
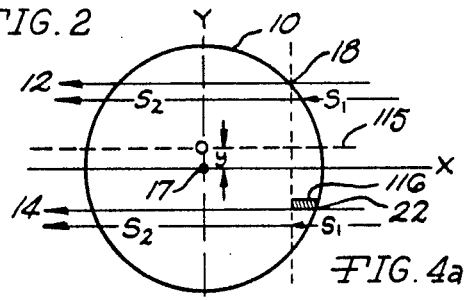
FIGS. 4a and 4b are diagrams illustrating how an error indication for deviation in an orthogonal direction is obtained.
Figure 4B:
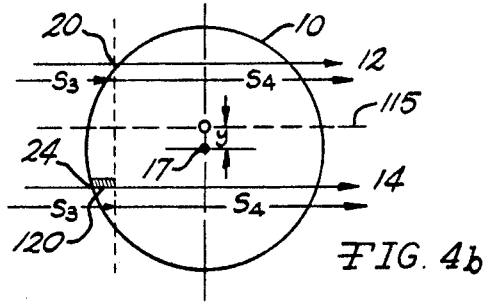

Referring to FIGS. 4a, 4b, in connection with the detection of a pitch error for rotation about the X-axis, at the beginning of the scanning cycle, during scan $S_1$, the first detector 30, 34 to acquire the horizon at the crossings 18 or 22, respectively, is noted by the logic circuit 40 and counting is initiated in the bidirectional counters 46. In the example illustrated in FIGS. 4a, 4b, the center of the scan in a direction transverse to the lines 12, 14 is designated by a horizontal dashed line 115 and a pitch error is designated by a displacement y along the Y-axis. The counters 46 are enabled and begin accumulating counts as soon as detector 34 senses the discontinuity at crossing 22. The direction of the count will depend upon which one of the two detectors 30, 34 first senses the discontinuity at the horizon. The counters continue to accumulate counts during the scan $S_1$ until the second detector 30 acquires the horizon at crossing 18 as represented by the cross hatched scanning interval 116. By way of illustration counters are assumed to count in a positive direction when detector 34 is first to sense the horizon. After detector 30 senses the crossing 18 any further signals during the scan $S_1$ will have no effect. During the scan $S_2$ analog are also disabled by the logic circuit 40 in response to an output at photocell 98 so that no data can be accumulated due to spurious signals. When the beginning of scan $S_3$ is designated to the logic circuit 40 by the scan reference 42 (photocell 104), the counters are again permitted to accumulate counts as soon as the detector 34 acquires the horizon at the crossing 24. Counters continue to count in the positive direction until detector 30 acquires the horizon at the crossing 20 as represented by the crosshatched scanning interval 120. The counter is disabled by the logic circuit 40 for the remainder of the scan $S_3$. Each of the scanning intervals 116, 120 as well as their sum, although measured in directions along the X-axis, will have both magnitude and direction related to a displacement y that in turn is proportional to the pitch error of satellite 16 about the X-axis from a predetermined orientation relative to earth 10. During the scan $S_4$ the accumulated count representing the sum of intervals 116, 120 is transferred from counters 46 to the correction system 48 for conversion to an analog signal to reposition satellite 16 toward the predetermined orientation. Although only one of the intervals 116, 120 is necessary to obtain an indication of the direction and magnitude of the pitch error, in the preferred embodiment the intervals 116, 120 are summed to average any errors that might have occurred in determining either one of the intervals. The combined result in stabilizing for rotation about the X- and Y-axes is to maintain the center of an essentially rectangular scanning pattern of lines 12, 14, oriented toward the center 17 of an essentially round earth 10. Since both detectors 30, 34 are used to determine the pitch error, the detectors should have approximately equal time constants and the level detectors 36, 38 should have equal and well regulated threshold levels.

By using separate bidirectional counters for the displacements $x, y$, all of the information required can be obtained and processed simultaneously during one scanning cycle. However, in the preferred embodiment, one scanning cycle consisting of the four scans $S_a, S_2, S_3, S_4$ is used to determine error in one direction by means of one counter, and on alternate scanning cycles the scans $S_1, S_2, S_3, S_4$ are used with the same counter to determine error in the other direction. Collection of the pitch and roll data on alternate scanning cycles permits a substantial simplification in the digital electronics of the bidirectional counters 46. By time sharing one bidirectional counter instead of using two counters simultaneously a substantial reduction in the size, weight, and expense of the counting circuits is also achieved.

Although in the preferred embodiment of the present invention specific intervals during the scans $S_1, S_2, S_3, S_4$ have been described for accumulating counts representing deviations along the X- and Y-axes, it will be apparent that other intervals could be used. For example to determine a displacement corresponding to the displacement $x$ (FIGS. 3a, 3b), an interval could begin at the beginning of a scan $S_1$ and terminate when the horizon is first acquired by one of the detectors 30, 34. On the return scan $S_3$, the counter would count in the opposite direction until the same detector again acquires the horizon. Similarly to determine a displacement corresponding to the displacement y (FIGS. 3a, 3b) the scanning intervals could begin at the scanning limits and end when the horizon is sensed. Error determination based on the intervals 112, 114, 116 and 120 described in connection with FIGS. 3 and 4, is preferred since scanning is substantially linear during the center portion of the scan lines 12, 14. Additionally the intervals 112, 114, 116, 120 do not depend on the precise location of the scanning limits which might vary particularly when flexural pivots are used to support the oscillating mirror 64. Other techniques to determine error based on the acquisition of the horizon along two parallel reciprocating scans will be apparent to those skilled in the art. One important aspect of the present invention is that all the required information can be obtained by means of the two reciprocating scan lines which can be generated by a simple and reliable arrangement having essentially only one moving part, that is, the oscillating scanning mirror 64.

It will also be understood that the method and apparatus for sensing the earth's horizon and obtaining error signals representing a deviation by the orbiting satellite from a fixed predetermined orientation relative to the earth have been described and disclosed for purposes of illustration and explanation and are not intended to indicate the limits of the present invention the scope of which is defined by the following claims.

We claim:

1. In the method of maintaining an object in predetermined relation to an elliptic body presenting its horizon to said object the steps of scanning for radiation along a first scan line which crosses the horizon, scanning for radiation along a second scan line which crosses said horizon at another point, detecting a first horizon position on said first scan line by detecting a radiation change as the scan crosses said horizon, detecting a second horizon position on said second scan line by detecting a radiation change as the scan crosses said horizon, and then correlating said first position with said second position to obtain an error indication representing a deviation by the object from a predetermined relation to the body.

2. The method set forth in claim 1 wherein said step of scanning for radiation along a second scan line comprises scanning along a line displaced laterally from said first scan line, and wherein said first and said second positions are correlated to obtain an error indication representing a rotational deviation by said object about an axis parallel to at least portions of said first and said second scan lines.

3. The method set forth in claim 1 wherein said step of scanning for radiation along a second scan line comprises scanning along a line axially aligned with said first scan line, and said first and said second positions are correlated to obtain an error indication representing a rotational deviation by said object about an axis perpendicular to at least portions of said scan lines.

4. An apparatus for maintaining an object in a predetermined orientation relative to a radiating body which presents a generally circular horizon to said device comprising first and second infrared detectors, optical means for projecting a first image of said first detector and a second image of said second detector in a direction generally toward said radiating body, said optical means including scanning means for moving said first image along a first rectilinear scanning line and for moving said second image along a second rectilinear scanning line generally parallel and in spaced relation to said first scanning line, said first detector being responsive to radiation from said first scanning line to develop an electrical signal representing radiation level variations along said first scanning line, said second detector means being responsive to radiation from said second scanning line to develop a second electrical signal representing radiation level variations along said second scanning line, first level detection means responsive to said first signal to provide first indications when said first image crosses said horizon and second level detection means responsive to said second electrical signal to provide second indications when said second image crosses said horizon, and comparison means responsive to selected ones of said first and said second indications to provide an error indication representing deviation of said object from said predetermined orientation relative to said body.

5. The apparatus set forth in claim 4 wherein said scanning means comprises a reflector, and drive means for oscillating said reflector, said optical means and said detectors being arranged so that oscillation of said reflector causes said first image and said second image to reciprocate along said first and said second lines in synchronism.

6. The apparatus set forth in claim 4 wherein said comparison means comprises means responsive to one of said first indications when said first beam crosses said horizon in one direction and responsive to another of said first indications when said first beam crosses an opposite horizon in the opposite direction and operable in response to said one and said other of said first indications to provide a difference signal representing a rotational deviation of said object relative to said body about an axis generally transverse to said first and second scan lines.

7. The apparatus set forth in claim 4 wherein said comparison means comprises means responsive to one of said first indications when said first beam crosses said horizon in a first direction and responsive to one of said second indications when said second beam crosses said horizon in said one direction and operable to provide an error signal representing a scanning displacement between said one of said first indications and said one of said second indications, said displacement being proportional to a rotational deviation by said object relative to said body about an axis generally parallel to scan lines.

8. The apparatus set forth in claim 4 wherein said comparison means comprises reference means to provide a reference signal when said beams cross the center of said scanning lines and said comparison means is responsive to said reference signal and said selected ones of said indications to provide said error indication.

9. Apparatus for determining the orientation of an object with respect to an elliptic body presenting its horizon to said object comprising:

radiation-receiving means constructed to receive radiation along a first line path which crosses the horizon of an elliptic body at two points, and to receive radiation from along a second line path which also crosses said horizon;

detecting means constructed to detect first and second horizon positions on said first line path and to detect a third horizon position on said second line path by detecting a radiation change at points where said line paths intercept said horizon;

means for correlating said first position with said second position and for correlating one of said positions on said first line path with said third position to obtain a complete determination of orientation with respect to said elliptic body.

10. The apparatus set forth in claim 9 wherein said means for receiving radiation include a reflector and means for oscillating said reflector to scan along said first and second line paths in synchronism.

11. The apparatus set forth in claim 9 wherein said radiation-receiving means is constructed to scan for radiation along said paths and said correlator means is constructed to compare the displacement of said first horizon position from the center of said first path with the displacement of said second horizon position from the center of said first path to obtain an indication or orientation.

12. The apparatus set forth in claim 9 wherein said radiaton-receiving means is constructed to scan for radiation along two generally parallel, rectilinear line paths, and said correlator means is constructed to compare the displacement of said first horizon position from the center of said first scan line with the displacement of said third horizon position from the center of said second scan line to obtain an orientation indication representing the degree of rotation about an axis perpendicular to said scan lines.

13. The apparatus set forth in claim 9 wherein:

said means for receiving radiation is constructed to scan for radiation along two generally parallel, rectilinear line paths;

said apparatus for receiving radiation along said line paths includes means for scanning for radiation across and beyond said body along said first and second paths so that each scan traverses said horizon twice at each opposite side of said body during one scanning cycle;

said detecting means is constructed such that said first position is detected on said first path when scanning in one direction across said horizon at one side of said body, said second position is detected on said first path when scanning in an opposite direction across said horizon at an opposite side of said body, said third position is detected on said second path when scanning in said one direction across said horizon at said one side of said body, and a fourth position is detected on said second path when scanning in said opposite direction across said horizon at said opposite side of said body; and said correlator means is constructed to provide one indication representing a difference between said first and said third positions detected while scanning in said one scanning direction and to provide a second indication representing a difference between said second and said fourth positions detected while scanning in said opposite scan direction.

14. The apparatus set forth in claim 9 wherein said detecting means is constructed to determine the points of interception of said paths and said horizon when scanning in a direction from space to body.